United States Patent [19]

Kolze

[11] Patent Number: 4,460,006
[45] Date of Patent: Jul. 17, 1984

[54] FREEZE PROTECTION VALVE

[75] Inventor: Lawrence A. Kolze, Bensenville

[73] Assignee: Eaton Corporation, Cleveland, Ohio

[21] Appl. No.: 340,605

[22] Filed: Jan. 19, 1982

[51] Int. Cl.³ .................. F16K 17/00; G05D 23/02
[52] U.S. Cl. ........................................ 137/62; 60/527;
126/420; 137/216; 137/468; 236/93 R;
236/100; 237/80; 251/11
[58] Field of Search ............... 137/59, 62, 216, 218,
137/468; 60/527; 126/419, 420, 422; 236/93 R,
93 B, 99.5, 100, 93 A; 237/80; 251/11

[56] References Cited

U.S. PATENT DOCUMENTS

| | | | |
|---|---|---|---|
| 1,268,648 | 6/1918 | Van Meter | 137/62 |
| 3,158,169 | 11/1964 | Smith | 137/216 |
| 3,333,527 | 8/1967 | Bender | 251/11 |
| 3,369,556 | 2/1968 | Allderdice | 137/62 |
| 3,887,159 | 6/1975 | Obermaier et al. | 251/11 |
| 3,961,606 | 6/1976 | Wong | 251/11 |
| 3,965,922 | 6/1976 | McCornack | 137/218 |
| 4,036,433 | 7/1977 | Wagner et al. | 251/11 |
| 4,066,090 | 1/1978 | Nakajima et al. | 137/62 |
| 4,128,203 | 12/1978 | Maltby | 251/11 |
| 4,296,770 | 10/1981 | Rice | 137/62 |

*Primary Examiner*—George L. Walton
*Attorney, Agent, or Firm*—Fay & Sharpe

[57] ABSTRACT

The freeze protection valve includes a valve housing (A) which has a bore (20) through a lower wall portion (22) thereof to define a freeze drain outlet (B). A valve assembly (C) including a valve cup (50), a valving element (54), and a valve element biasing spring (56) is biased away from the valve housing lower wall portion by a valve cup spring (60). A thermal sensing assembly (D) including a thermal sensing element (82) which is disposed closely adjacent the valving element urges the valve assembly toward the lower wall portion as the temperature of fluid around the thermal element increases and allows the valve cup biasing spring to move the valving element away from the lower wall portion as the fluid around the thermal sensing element cools below a preselected temperature. In this manner, the valve assembly opens the freeze drain outlet in response to the fluid at the bottom of the valve housing adjacent the valve assembly dropping below a preselected temperature. A discharge stem (30) extends downward from the valve housing lower wall portion to provide an outlet path for fluids discharged through the freeze drain outlet. A cross bore (100) extending horizontally through the discharge stem immediately adjacent the freeze drain outlet provides an air break (E) between the freeze drain outlet and any fluids in the discharge stem bore to prevent discharged fluids which may have become contaminated from being drawn back into and mixed with the fluids in the freeze protection valve.

20 Claims, 2 Drawing Figures

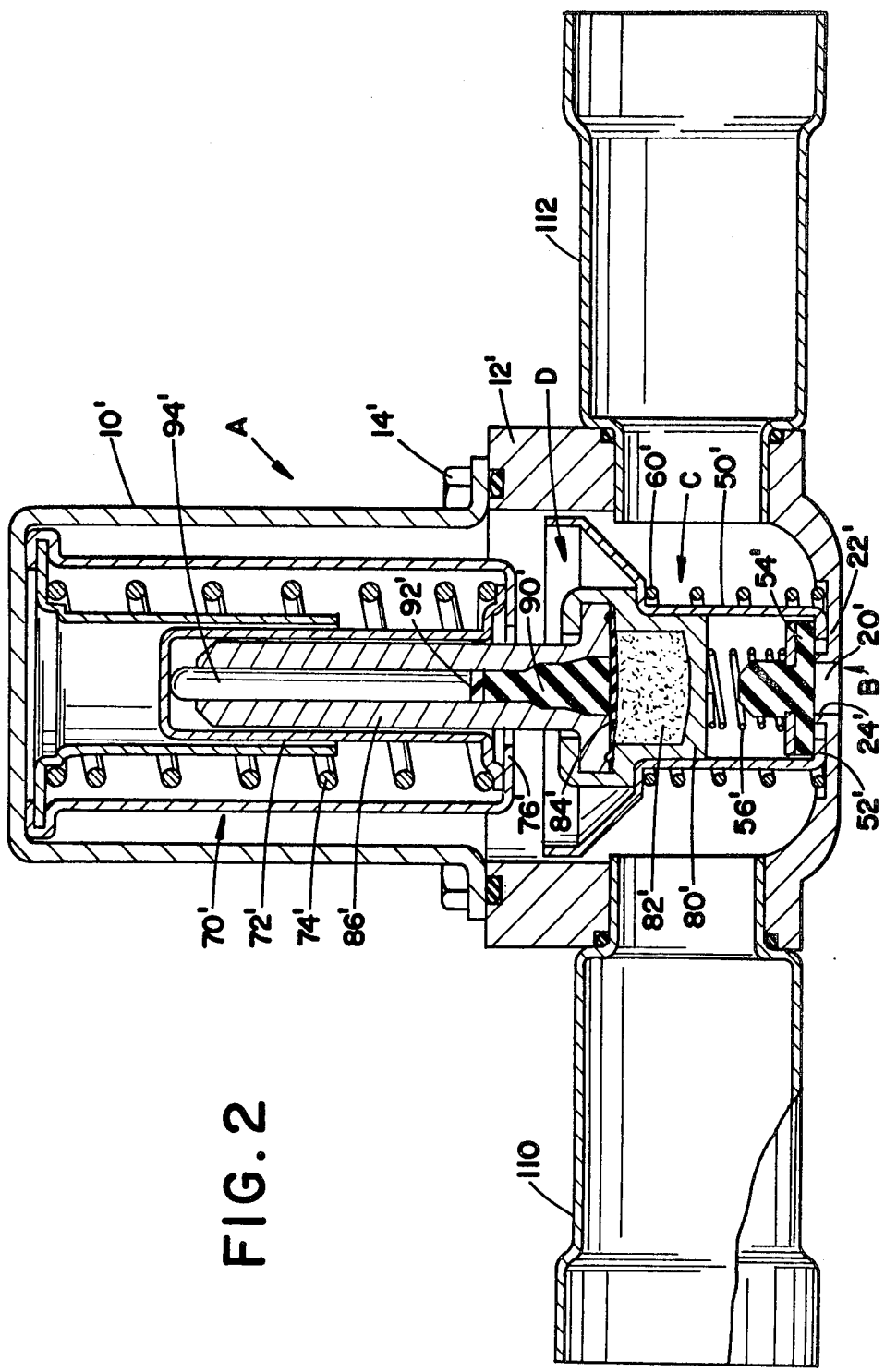

FREEZE PROTECTION VALVE

BACKGROUND OF THE INVENTION

This application pertains to valves which selectively open and close in response to environmental conditions. More particularly, the invention relates to freeze protection valves which open automatically in response to a preselected low temperature condition. The invention finds particular application in freeze protection valves for solar heating systems and will be described with particular reference thereto. It is to be appreciated, however, that the invention has broader applications including freeze protection for sections of residential and commercial plumbing system and other fluid carrying or holding systems which may become exposed to freezing or near freezing conditions.

Conventionally, solar water heating systems have a roof mounted collector panel which includes an upper header or manifold, a lower header or manifold, and a plurality of tubes extending between the upper and lower headers. In a thermosiphon type solar heater, as the water is heated by the sun, it rises through the tubes from the lower header toward the upper header. A solar heated hot water storage tank is positioned above the upper header, commonly on the external surface of the roof. A cold water feed line connects the bottom of the hot water storage tank with the lower header to provide a path for the coolest water in the bottom of the tank to flow to the solar collector unit to be heated. A warm water return path connects the upper header with the storage tank to allow the solar heated water to rise from the upper header to the top of the tank. The storage tank has a warm water outlet from which heated water may be withdrawn and an inlet for replacing the withdrawn heated water with unheated water. In this manner, the water is heated and circulated by the thermosiphon effect.

To protect the solar water heating system from freezing, a freeze protection valve is connected below the lower header. When the temperature drops below a preselected low temperature, such as 45° F., the freeze protection valve opens draining water from the lower header and the solar heating system. The removal of the coldest water at the lowest portion of the system draws warmer water from the upper portions of the system raising the temperature of the solar collector piping and the freeze protection valve. The warmer water is usually at least 50° to 65° F., the temperature of unheated water received from a residential or commercial plumbing system. Thus, the freeze protection valve need only open intermittently to maintain the temperature in the solar heating system above the exemplary temperature of 45° F.

Commonly, the prior art freeze protection valves sense the temperature of the fluid at their upper, inlet end which is connected below but adjacent the lower header. Because cold water is denser than warm water, a temperature gradient occurs between the freeze drain valve's upper inlet and lower freeze drain outlet. Under extreme cooling conditions, the temperature gradient across the freeze protection valve allows the lower portion of the valve to freeze before the upper portion senses that it should be opened. This freezing, of course, defeats the freeze protection purpose of the valve.

Conventionally, the freeze protection valve has a nipple or fitting around the drain outlet for connecting the freeze protection valve with a drain line. Under certain conditions, a pressure differential may occur across the drain outlet which causes fluid in the drain line to be returned into the freeze protection valve and mixed with the water in the solar heating system. This raises the potential for the water in the drain line to become contaminated and for the contaminated water to be mixed with the potable water in the solar heating system.

The present invention contemplates a new and improved freeze protection valve which inhibits the freeze protection valve from freezing adjacent its drain outlet and which prevents discharged water in the drain line from becoming mixed with the water within the freeze protection valve.

SUMMARY OF THE INVENTION

In accordance with a first aspect of the present invention, there is provided a freeze protection valve which comprises a valve housing, a freeze drain outlet valving means, and a thermal sensing assembly. The valve housing has a first wall portion defining an inlet aperture therethrough and a second wall portion defining a freeze drain outlet therethrough. The freeze drain outlet valving means selectively opens and closes the freeze drain outlet. The valving means is disposed adjacent the valve housing second wall portion. The valving means includes a biasing means for biasing the valving means towards the open, draining positioning. The thermal sensing assembly extends with increasing temperature and contracts with lowering temperature. The thermal sensing assembly includes a thermal element cup disposed closely adjacent the valving means, a thermal sensing element disposed in the thermal element cup which expands with increasing temperature and contracts with decreasing temperature, and a piston means operatively connected at one end with the thermal element and operatively connected adjacent its other end with the valve housing. In this manner, as a thermal element expands, the thermal sensing assembly urges the valving means toward the closed position and as the thermal element contracts the biasing means biases the valving means towards the open position. Thus, the freeze protection valve opens and closes in response to the temperature closely adjacent the freeze drain outlet.

In accordance with a second aspect of the invention, there is provided a freeze protection valve comprising a valve housing, air break means, a valve means, and a thermal sensing assembly. The valve housing includes a first wall portion defining an inlet aperture therethrough, a bottom wall portion defining a freeze drain outlet therethrough, and a downward extending discharge stem having a longitudinal passage therethrough generally in vertical alignment with the freeze drain outlet. In this manner, fluid discharged through the freeze drain outlet falls by gravity into the discharge stem passage. The air break means is disposed in the discharge stem adjacent the freeze drain outlet to provide an air break between the freeze drain outlet and the discharge stem passage. The valve means is disposed within the valve housing adjacent the bottom wall portion for selectively opening and closing the freeze drain outlet. The thermal sensing assembly is operatively connected with the valve means and with the valve housing for selectively causing the valve means to open and close the freeze drain outlet in response to the temperature of the fluid within the valve housing. In this manner, fluid discharged from the freeze drain outlet is inhibited by the air break means from being returned through the valve means.

An advantage of one aspect of the present invention is that it renders the freeze protection valve less susceptible to malfunctioning due to freezing.

An advantage of another aspect of the present invention is that it inhibits contaminated drain water from being reintroduced into the fluid which is protected from freezing.

Still further advantages of the present invention will become apparent upon reading and understanding the following detailed description of the preferred and alternate embodiment.

BRIEF DESCRIPTION OF THE DRAWINGS

The invention may take form in various parts and arrangements of parts. The drawings are only for purposes of illustrating preferred embodiments of the invention and are not to be construed as limiting the invention.

DESCRIPTION OF THE PREFERRED AND ALTERNATE EMBODIMENT

Figure 1:
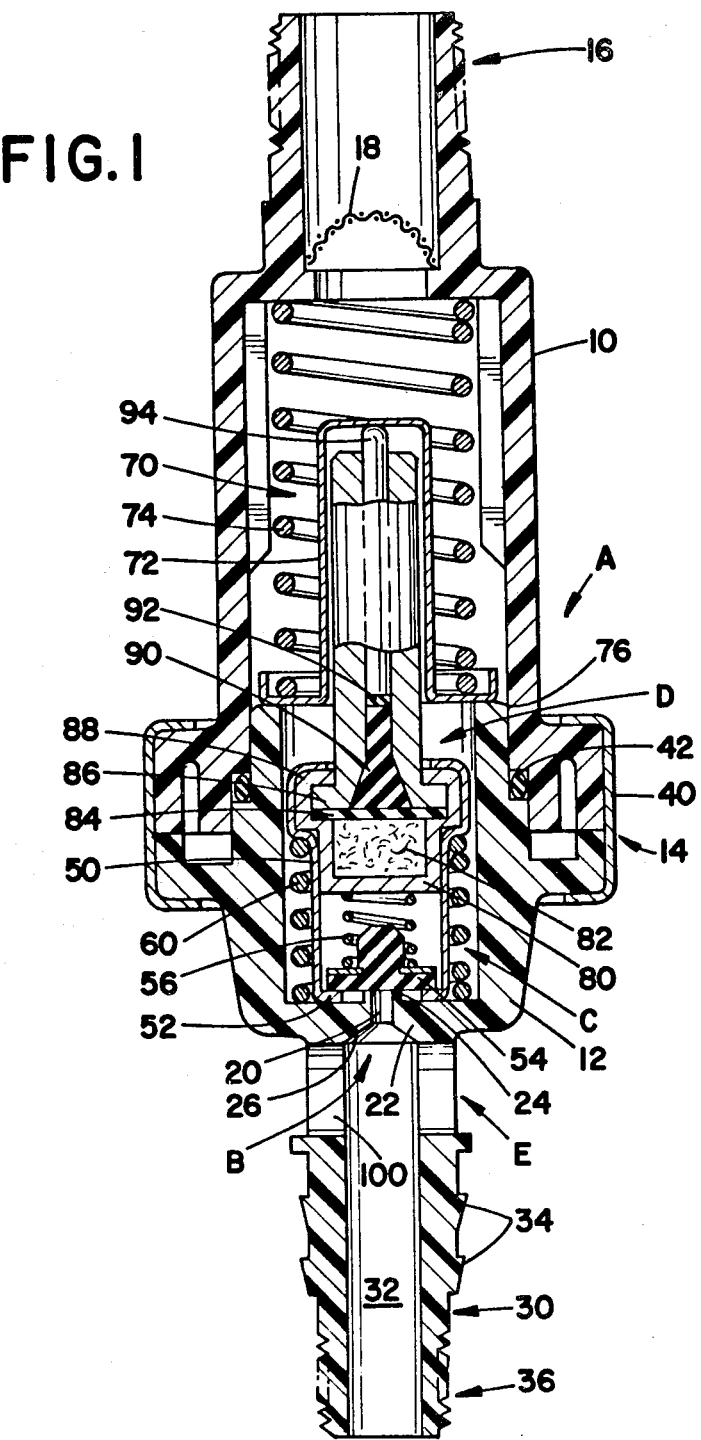
FIG. 1 is a cross-sectional view of a freeze protection valve in accordance with the present invention; and, FIG. 2 is a cross-sectional view of an alternate embodiment of a freeze protection valve in accordance with the present invention.

The freeze protection valve includes a valve housing A which has a freeze drain outlet B through a lower wall portion. A freeze drain valve assembly or means C is disposed in the valve housing for selectively opening and closing the freeze drain outlet. A thermal energy sensing assembly or means D is operatively connected between the valve housing A and the freeze drain valve means C for causing the freeze drain outlet to be closed at higher temperatures and causing the freeze drain outlet to be opened below a preselected lower temperature. In this manner, the freeze protection valve blocks water or other fluid from draining from an associated structure when the fluid is above the preselected temperature and allows the fluid within the associated structure to drain when the temperature is below the preselected temperature. An air break means E is disposed adjacent the freeze drain outlet B for providing an air barrier between the fluid in a drain line and the fluid in the housing. The air prevents a pressure differential between the valve housing and the drain line, thus preventing siphoning of drain water into the system.

Looking in detail to the embodiment of FIG. 1, the valve housing A includes an inlet or upper valve housing portion 10 and a second or lower valve housing portion 12 which are connected by connecting means 14. The upper valve housing portion terminates at a first or upper wall portion with an inlet fitting means 16 such as screw threads which are adapted to be connected with an associated structure. The upper valve housing portion and the inlet fitting means are hollow to define an inlet for receiving fluid from the associated structure. A screen 18 is disposed across the inlet to block particles from being carried into the valving means and the thermal sensing assembly to impair their operation. The lower valve housing portion 12 has an aperture or bore 20 through a lower valve wall portion 22 to define the freeze drain outlet B. An annular valve seat 24 projects inward from the second or lower wall portion and surrounds the drain bore 20 of the drain valve outlet B. The drain bore has a relatively low length to cross-sectional area ratio and a flared bore portion 26 such that any ice which might form therein is readily discharged. A discharge stem 30 extends downward from the lower valve wall portion 22 and surrounds the freeze drain bore 20. The discharge stem has a longitudinal fluid passage 32 for providing a fluid flow path for fluids discharged from the freeze drain outlet. A plurality of annular barbs 34 encircle the discharge stem for anchoring a frictionally received drain line or hose. A threaded portion 36 with a maximum diameter which is less than the minimum diameter of the annular barbs 34 is disposed adjacent the end of the discharge stem. The presence of the barbs and the threaded portion enable the freeze protection valve to be connected with a drain line with either a threaded engagement or with a frictional engagement.

The valve housing portion connecting means 14 includes a ferrule 40 which is crimped around the upper and lower valve body portions. An O ring 42 provides a fluid tight seal for the joint between the upper and lower valve body portions. Other means for connecting the upper and lower valve body portions, such as mating threaded portions, solvent welds, rivets, or the like are also contemplated by the present invention.

The freeze drain outlet valve means C includes a valve cup 50 which is interconnected with the thermal sensing assembly D such that it is urged toward the freeze drain outlet under increasing temperatures. The valve cup has a lower end 52 with a central aperture which surrounds the valve seat 24. The thickness of the bottom wall 52 is less than the inward extension of the valve seat 24 such that when the valve cup bottom wall is pressed firmly against the lower wall portion 22, the valve seat 24 projects inward beyond the valve cup bottom wall. A freeze drain valving element 54 is disposed within the valve cup to contact valve seat 24 when the valve cup is in its lowermost position. A valving element spring or biasing means 56 extends between the thermal sensing assembly and the valving element 54 to bias the valving element against the valve seat with a preselected pressure. A valve cup spring or biasing means 60 biases the valve cup and the valving element 54 away from the valve seat. The valve cup biasing means 60 has a greater spring force than the valving element biasing means 56 and a lesser spring force than the expansible force of the thermal sensing assembly D.

An over travel protection means 70 connects the thermal sensing assembly D with the upper valve housing portion 10. The over travel protection means allows the thermal sensing assembly to extend after the valve cup bottom wall 54 has engaged the valve housing bottom wall portion 26. The over travel protection means 70 includes an over travel spring guide 72 which is connected with the thermal sensing assembly to be urged upward thereby as it extends. An over travel protection spring 74 is disposed between the upper valve housing portion 10 and the over travel spring guide 72 to bias the over travel spring guide 72 and the thermal sensing assembly downward. A limit travel stop shoulder 76 limits the downward movement of the spring guide. The over travel protection spring 74 has a greater spring force than the valve cup biasing means 60.

The thermal sensing assembly D includes a thermal element cup 80 which is disposed at the end of the thermal sensing assembly closest to the freeze drain valving element 54. A thermal sensing element 82 which expands and contracts with changes in its temperature is contained within the thermal element cup. In the preferred embodiment, the thermally expansible element 82 is a thermally expansible wax pellet of composition well-known to those skilled in the art which expands with increasing temperature and contracts with decreasing temperature. A flexible diaphragm 84 extends across the open end of the thermal element cup and the corresponding surface of the thermal element. A piston guide 86 is disposed adjacent the diaphragm 84 and constrains the diaphragm between the piston guide and the thermal element cup. The piston guide and the thermal element cup are maintained in a position firmly engaging the diaphragm by a clamping means 88. A piston assembly extends from the diaphragm 84 through an open bore defined by the piston guide 86. In the preferred embodiment, the piston assembly includes a force transmitting and amplifying means 90 which is connected by a polymeric spacer 92 with a rigid piston 94. The force transmitting means is a relatively incompressible rubber material which functions as a fluid. The piston guide bore expands adjacent the expansion element such that the rubber material functions as a fluid amplifier. The spacer inhibits the rubber material from flowing between the piston and the piston guide. As the thermal element 82 is warmed and expands, the piston 94 and the thermal element cup 80 are urged apart. As the thermal element 82 cools and contracts, the valve cup biasing means 60 and the over travel protection spring 74 urge the piston 94 and the thermal element cup 80 toward each other. In this manner, the spring 60 functions as a thermal element cup biasing means to bias the thermal element cup and with it the attached valve cup and valve element away from the freeze drain outlet. By positioning the thermal element cup 80 and the thermal element, in the valve cup 50 and closely adjacent the valve seat 24, the thermal element is responsive to the temperature of the fluid adjacent the freeze drain outlet B. Because colder water is denser and settles toward the lowest point of the system and the freeze protection valve is normally disposed with the freeze drain outlet B at the lowest point of the system, the thermal element senses the temperature of the coldest water or other fluid in the protected fluid system. The freeze protection valve provides freeze protection even when there are large thermal gradients across the freeze protection valve. This is particularly important when the temperature gradient across the freeze protection valve exceeds the difference between the preselected drain temperature and freezing. Further, the ambient air temperature tends to cool most rapidly the extremes of the system, particularly the lowest end of the freeze protection valve.

The air break means E includes a cross hole or bore 100 defined by the lower valve housing portion and which is transverse to the discharge stem bore 32 and is immediately adjacent the flanged bore portion 26. When the freeze protection valve is positioned in its normal, vertical position with the discharge stem bore extending vertically, the cross bore extends horizontally. In this manner, fluid discharged from the freeze drain flows by gravity past the cross bore through the discharge stem bore to a suitable disposal location. The cross bore provides antisiphon protection to prevent discharged fluids which may possibly become contaminated from being drawn back into the freeze protection valve. Further, the cross bore inhibits fluids from remaining in the discharge stem bore and the drain line and provides an overflow outlet if fluids should be forced up the discharge stem bore or the drain line or if the drain line should become clogged.

In operation, the coolest water or fluid in the associated system flows into the lower part of the freeze protection valve. The warmth of the water causes the thermal element 82 to expand or contract by a corresponding amount. When the water is warmer than the preselected drain temperature, the extension of piston 94 and thermal element cup 80 increases forcing the valve cup 50 against the lower wall portion 22 and the valving element 54 closes the freeze drain outlet B. When the water is hot enough to increase the piston and thermal element cup extension further, the over travel spring 74 is compressed to protect the thermal sensing assembly D from its internal forces. When the water cools below the predetermined drain temperature, the piston and thermal element cup extension contracts allowing the over travel spring 74 to bias the spring guide 72 against the stop 76. Still further contraction permits the valve cup biasing spring 60 to lift the valve cup 50 and with it the valving element 54. As the colder fluid drains from the bottom of the freeze protection outlet through the air break and into the drain, warmer water may replace it. The warmer water causes the thermal element 82 to expand closing the valve. In this manner, the freeze protection valve opens and closes intermittently.

With reference to FIG. 2, a freeze protection valve for providing freeze protection to a fluid flow line is illustrated. Elements of the freeze protection valve of FIG. 2 which are common to the elements of the freeze protection valve of FIG. 1 are denoted with the same reference numeral followed by a prime ('). The valve housing A of the inline freeze protection valve includes an upper valve housing 10' and a lower valve portion 12' which are interconnected by bolts or other suitable connecting means 14'. The lower valve housing 12' defines a pair of fluid flow ports which are connected with tubing portions 110 and 112 to form an inlet and outlet for fluid flow through the lower valve housing portion. A lower wall portion 22' has a raised freeze drain valve seat 24' surrounding freeze drain outlet bore 20'.

The freeze drain valving means C includes a valve cup 50' having a bottom valve cup wall portion 52' which is adapted to abut the lower valve housing wall portion 22'. The lower valve cup wall defines an enlarged aperture therein through which the valve seat 24' is receivable. The valve cup has an upper horizontal shoulder which engages a corresponding surface of the thermal sensing assembly D such that the valve cup is urged toward the drain outlet as the thermal sensing element expands.

A valving element 54' and a valving element spring or biasing means 56' are disposed within the valve cup 50'. The valve cup bottom wall 52' is thinner in vertical dimension than the inward extension of the valve seat 24'. A valve cup biasing means 60' biases the valve cup upward, away from the valve seat and against the thermal sensing assembly D.

An over travel protection means 70' is disposed in the upper valve housing between the thermal sensing assembly and the upper valve housing 10'. The over travel protection means includes an over travel spring guide 72' which is connected with the thermal sensing assembly to be urged upward thereby and with an over travel protection spring 74' to be urged downward thereby. A stop means 76' limits the downward travel of the spring guide.

The thermal sensing assembly D includes a thermal element cup 80' having a thermally expansible element 82' disposed therein. The thermal element cup extends downward into the valve cup 50' and is disposed closely adjacent the valving element 54' at the freeze drain outlet. A diaphragm 84' is connected between the thermal element cup 80' and a piston guide 86'. The piston guide 86' has a central bore in which a piston assembly including a resilient rubber material 90', a spacer 92', and a piston 94' are disposed. As the thermal element expands and contracts with changes in temperature, the extension or distance between the piston 94' and the thermal element cup 80' extends or contracts correspondingly.

In normal operation, the fluid flowing between the inlet and outlet 110 and 112 has a temperature well above its freezing point. If the valve is positioned in a cold water line, the temperature of the water is commonly on the order of 50° to 65° F. When the valve is positioned in a hot water line, the normal temperature of the water is commonly on the order of 120° to 180° F. When the flow of water through the freeze protection valve stops, the temperature of the water in the line and in the valve tends to approach the temperature of the ambient air therearound. As the water or other fluid in the freeze protection valve cools toward freezing, the thermal sensing element 82' contracts allowing the over travel spring 84' to urge the over travel spring guide 72' against the limit stop means 76'. Further cooling and further contraction of the thermal sensing element 82' reduces the length of the thermal sensing assembly, i.e. the distance between the thermal element cup 80' and the piston 94'. This allows the valve cup biasing means 60' to bias the valve cup 50' and with it the valve element 54' away from the valve seat 24'. The thermal expansion element 82' and the geometry of the system are selected such that the valve element 54' is lifted from the valve seat 24' at a predetermined temperature approaching the freezing temperature of the fluid. In the preferred embodiment, this predetermined temperature is about 45° F., although other temperatures may also be selected.

The invention has been described with reference to the preferred embodiment. Obviously, modifications and alterations will occur to others upon reading and understanding the preceding detailed description of the preferred embodiment. It is intended that the invention be construed as including all such alterations and modifications which come within the scope of the following claims or the equivalents thereof.

Having thus described the preferred embodiment of the invention, I now claim my invention to be:

1. A freeze protection valve comprising:
   a valve housing having a first wall portion defining an inlet aperture therethrough and a second wall portion defining a freeze drain outlet therethrough, the first and second wall portions defining a fluid receiving reservoir therebetween;
   a freeze drain outlet valving means for selectively opening and closing the freeze drain outlet, the valving means including a valving element disposed completely within the valve housing fluid receiving reservoir adjacent the second wall portion for selectively engaging the freeze drain outlet in a sealing relationship to control the flow of fluid therethrough; and,
   a thermal sensing assembly disposed completely upstream of said drain outlet and including a thermal element cup disposed in the valve housing fluid receiving reservoir closely adjacent to and operatively connected with the valving element, a thermal sensing element disposed in the thermal element cup which expands with increasing temperature and contracts with decreasing temperature, a thermal element cup biasing means for biasing the thermal element cup away from the freeze drain outlet upstream toward the inlet aperture and deeper into the fluid receiving reservoir, the thermal element biasing means being disposed completely within the fluid receiving reservoir, a piston means operatively connected at one end with the thermal element, an over travel protection spring means operatively connected between the piston means and the valve housing, the over travel protection spring means having a greater spring force than the thermal element cup biasing means such that as the thermal element expands, the thermal sensing assembly urges the valving element toward the closed position, as the thermal element expands further, the over travel protection spring is compressed, and as the thermal element contracts, the thermal element cup biasing means biases the thermal element cup and the valving element away from the freeze drain outlet toward the open position, whereby the freeze protection valve opens and closes in response to the temperature closely adjacent the freeze drain outlet.

2. The valve as set forth in claim 1 wherein the piston means and the over travel protection spring are disposed within the fluid receiving reservoir.

3. A freeze protection valve comprising:
   a valve housing having a first wall portion defining an inlet aperture therethrough and a second wall portion defining a freeze drain outlet therethrough;
   thermal sensing assembly which extends with increasing temperature and contracts with lowering temperature, the thermal sensing assembly including a thermal element cup disposed adjacent the freeze drain outlet, a thermal sensing element disposed in the thermal element cup which expands with increasing temperature and contracts with decreasing temperature, a thermal sensing cup biasing means for biasing the thermal sensing cup away from the freeze drain outlet, a piston means operatively connected at one end with the thermal element and operatively connected adjacent its other end with the valve housing such that as the thermal element expands, the thermal sensing assembly urges the thermal element cup toward the freeze drain outlet and as the thermal element contracts the thermal element cup biasing means biases the thermal element cup away from the freeze drain outlet;
   a freeze drain outlet valving means for selectively opening and closing the freeze drain outlet, the freeze drain valving means being disposed adjacent the valve housing second wall portion, the valving means including a valve cup which is operatively connected with the thermal element cup to be urged downward thereby, the valve cup having a bottom valve wall which is adapted to abut the second wall portion, the valve cup bottom wall having an aperture therein which surrounds the freeze drain outlet, a valving element disposed within the valve cup between the valve cup bottom wall and the thermal element cup, and valve element biasing means for biasing the valving element against the valve cup bottom wall.

4. The valve as set forth in claim 3 further including a valve seat disposed on the valve housing second wall portion surrounding the freeze drain outlet and extending into the valve housing a distance greater than the thickness of the valve cup bottom wall, whereby the valve element biasing means determines the pressure of which the valving element contacts the valve seat when the valve cup bottom wall is firmly against the valve housing second wall portion.

5. The valve as set forth in claim 4 wherein the valve cup includes a ferrule portion which is crimped around at least the thermal element cup for connecting the valve cup and thermal element cup together.

6. The valve as set forth in claim 3 further including over travel protection means for allowing the thermal element to continue to expand after the valve cup bottom wall has contacted the valve housing second wall portion.

7. The valve as set forth in claim 6 wherein the over travel protection means includes an over travel protection spring guide which is urged away from the valve housing second wall portion wall by the thermal sensing assembly and an over travel protection spring which biases the over travel spring guide toward the valve housing second wall portion, the spring force of the over travel protection spring exceeding the spring force of the valve cup biasing means.

8. The valve as set forth in claim 3 wherein the first wall portion is disposed at its upper end and the second wall portion is disposed at its lower end, such that the thermal sensing element is displaced from the inlet and adjacent the freeze drain outlet, whereby operation of the valving means is independent of any temperature gradient across the valve.

9. The apparatus as set forth in claim 3 wherein the valve housing further includes a third wall portion having an opening therethrough to define a flow outlet opening, the inlet opening and the flow outlet opening being disposed in fluid communication around the thermal sensing element such that fluid is able to flow in the inlet, through the valve housing and out the flow outlet.

10. The valve as set forth in claim 3 further including an internal bore in fluid communication with the freeze drain outlet and a cross bore for providing an air break between the freeze drain outlet and the discharge stem bore.

11. A freeze protection valve comprising: a valve housing including a first wall portion defining an inlet aperture therethrough, a bottom wall portion defining a freeze drain outlet therethough, a downward extending discharge stem having a longitudinal passage therethrough generally in vertical alignment with the freeze drain outlet, whereby fluid discharged through the freeze drain outlet falls by gravity into the discharge stem passage;

a valve means disposed within the valve housing adjacent the bottom wall portion for selectively opening and closing the freeze drain outlet the valve means including a valve cup means having a bottom valve wall which is adapted to abut the bottom wall portion, the valve cup bottom wall defining an aperture therein which surrounds the freeze drain outlet, a valving element disposed within the valve cup means, a valve element biasing means for biasing the valving element against the valve cup bottom wall; and, a thermal sensing element which expands with increasing temperature and contracts with decreasing temperature, the thermal sensing element being operatively connected with the valve cup means and with the valve housing for selectively causing the valving element to open and close the freeze drain outlet in response to the temperature of the fluid within the valve housing, whereby fluid discharged from the freeze drain outlet is inhibited by the air break means from being returned through the valving means.

12. The valve as set forth in claim 11 wherein the air break means includes an aperture extending through the discharge stem in fluid communication with the discharge stem passage.

13. The valve as set forth in claim 12 wherein the air break aperture is closely adjacent the lower wall portion.

14. The valve as set forth in claim 13 wherein the freeze drain outlet includes a flared bore portion to facilitate the release of ice from the freeze drain outlet.

15. The valve as set forth in claim 10 further including a valve seat disposed on the valve housing second bottom wall portion surrounding the freeze drain outlet and extending into the valve housing a distance greater than the thickness of the valve cup bottom wall, whereby the valve element biasing means determines the pressure of which the valving element contacts the valve seat when the valve cup bottom wall is firmly against the valve housing bottom wall portion.

16. The valve as set forth in claim 11 further including air break means disposed in the discharge stem adjacent the freeze drain outlet to provide an air break between the freeze drain outlet and the discharge stem passage.

17. A freeze protection valve comprising: a valve housing defining an inlet aperture in one end thereof, a freeze drain outlet aperture adjacent a generally opposite end thereof, and a fluid receiving reservoir therebetween;

a thermal sensing assembly which extends with increasing temperature and contracts with lowering temperature, the thermal sensing assembly being disposed disposed completely upward of said drain outlet and within the valve housing fluid receiving reservoir closely adjacent the freeze drain outlet aperture;

a valving element disposed in the valve housing fluid receiving reservoir adjacent the outlet aperture to control the flow of fluid therethrough, the valving element being operatively connected with the thermal sensing assembly for movement therewith; and, biasing means for biasing the thermal sensing assembly and the valving element away from the outlet aperture upward toward the inlet aperture and deeper into the valve housing fluid receiving reservoir such that extension of the thermal sensing assembly with increasing temperature overcomes the biasing means to close the freeze drain outlet aperture and contraction of the thermal sensing assembly with lower temperature allows the biasing means to bias the valving element away from the freeze drain outlet aperture, the biasing means being disposed within the valve housing fluid receiving reservoir with the thermal sensing assembly, whereby the biasing means is protected from becoming encased in ice.

18. The valve as set forth in claim 17 wherein the thermal sensing assembly includes a thermal element cup disposed in the valve housing adjacent the outlet aperture, a thermal sensing element which expands with increasing temperature and contracts with decreasing temperature disposed in the thermal element cup, and a piston assembly operatively connected with the thermal sensing element and the valve housing such that the thermal element cup undergoes movement within the valve housing toward and away from the outlet aperture as the thermal sensing element expands and contracts.

19. The valve as set forth in claim 18 further including a valve element biasing means for biasing the valving element toward the outlet aperture, the valve element biasing means being operatively connected with the thermal element cup and the valving element.

20. The valve as set forth in claim 17 further including a discharge stem disposed downstream from the outlet aperture and an air break means disposed downstream from the outlet aperture to provide an air break between the outlet aperture and the discharge stem.

* * * * *